United States Patent [19]

Sato et al.

[11] Patent Number: 4,574,139

[45] Date of Patent: Mar. 4, 1986

[54] POLYMER HAVING A FLUORINE-CONTAINING END GROUP AND PRODUCTION OF THE SAME

[75] Inventors: Toshiaki Sato; Junnosuke Yamauchi, both of Kurashiki; Takuji Okaya, Nagaokakyo, all of Japan

[73] Assignee: Kuraray Co., Ltd., Kurashiki, Japan

[21] Appl. No.: 614,158

[22] Filed: May 25, 1984

[30] Foreign Application Priority Data

Jun. 17, 1983 [JP] Japan ................................. 58-109798
Jun. 17, 1983 [JP] Japan ................................. 58-109799

[51] Int. Cl.$^4$ ................................................. C08F 8/18
[52] U.S. Cl. ...................................... 525/61; 525/343; 525/350; 526/209; 526/222; 528/376
[58] Field of Search ................ 526/243; 525/343, 350, 525/61; 528/375, 376

[56] References Cited

U.S. PATENT DOCUMENTS 4,171,415  10/1979  Kleiner ................................. 526/243
4,266,080   5/1981  Falk ..................................... 528/376

Primary Examiner—Paul R. Michl
Attorney, Agent, or Firm—Oblon, Fisher, Spivak, McClelland & Maier

[57] ABSTRACT

A polymer having a fluorine-containing end group which is produced by polymerizing a monomer capable of radical polymerization in the presence of a fluorine-containing thiol; a vinyl ester polymer having a fluorine-containing end group which is produced by polymerizing vinyl ester in the presence of a fluorine-containing thiol; and vinyl alcohol polymer having a fluorine-containing end group which is produced by saponifying the said vinyl ester polymer; and processes for producing the same are provided.

The polymers of this invention are superior in water repellency, oil repellency, heat resistance, chemical resistance, and surface activity which are characteristic of fluorocarbon compounds, and are expected to find use in various application areas.

10 Claims, No Drawings

POLYMER HAVING A FLUORINE-CONTAINING END GROUP AND PRODUCTION OF THE SAME

BACKGROUND OF THE INVENTION

1. Field of the Invention

The present invention relates to a polymer having a fluorine-containing end group which is obtained by radical polymerization of a monomer capable of radical polymerization in the presence of a fluorinated thiol, and also to a process for producing said polymer.

2. Description of the Prior Art

It is known well that fluorocarbons provide characteristic surfaces which are hard to get wet and to become dirty and are slippery, on account of the extremely low surface energy they have. They are also superior in heat resistance and chemical resistance. Because of these characteristic properties, fluorocarbons have recently come into use for surface finish, and the surface finish with fluorocarbons is finding use in many application areas.

Fluorocarbon surfactants are superior in interfacial properties to hydrocarbon surfactants. They draw public attention because they produce a good effect even when used in small quantities. However, since fluorocarbon compounds are generally expensive, it is expected that they will find use more in the area where their characteristic surface properties are of importance, than in the area where their bulk properties are utilized. Typical examples of their use include the soil-resistant finishing that imparts water repellency and oil repellency to textiles and film.

For example, Japanese Patent Laid-open No. 139679/1979 discloses a process for producing surface-treated polyvinyl alcohol film. According to this process, a dispersion or solution of fluoroplastic such as tetrafluoroethylene is applied, followed by drying, to the surface of polyvinyl alcohol film. The surface treatment of a material with a fluorocarbon compound, as in the above case, has a disadvantage that sufficient adhesion is not achieved between the substrate material and the fluorocarbon compound coated because the characteristic surface properties of the fluorocarbon compound interfere with adhesion, in other words, the superior surface properties of the fluorocarbon compound do not last for a long time of period. Thus there is a demand for a new technology that overcomes this disadvantage.

One way of improving the durability is to chemically bond the fluorine-containing compound to the surface of a polymeric substrate through graft polymerization which is usually achieved by irradiation or electrical discharge. Graft polymerization by irradiation is not generally used because irradiation severely deteriorates the polymeric substrate. Graft polymerization by electrical discharge is in limited use as disclosed in Japanese Patent Laid-open No. 56671/1979 which claims a fluorinated polymeric substrate having the surface layer formed by graft polymerization of a fluorine-containing unsaturated monomer by electrical discharge.

Graft polymerization by electrical discharge is achieved by any one of the following ways, which all require complex processes and operation.

(1) The surface of the substrate is activated by electrical discharge and then exposed to a vapor of fluorine-containing monomer. (This is suitable for a fluorine-containing monomer of high vapor pressure.)

(2) The surface of the substrate is activated by electrical discharge and then brought into contact with a solution of fluorine-containing monomer. (This is suitable for a fluorine-containing monomer of low vapor pressure.)

(3) The surface of the substrate is activated by electrical discharge and exposed to oxygen or an oxygen-containing gas and finally brought into contact with a heated solution of fluorine-containing monomer. In addition, graft polymerization by electrical discharge does not form a uniform layer on a polymeric substrate having an intricate, irregular surface.

In order to overcome the above-mentioned disadvantages, the present inventors carried out a series of researches on the process for modifying the plastics surface with a fluorocarbon compound. As the result, it was found that an improved surface is obtained by the aid of a polymer having a fluorine-containing end group which is produced by polymerizing monomers capable of radical polymerization in the presence of a fluorinated thiol.

The present inventors also investigated the method for improving the surface of polyvinyl ester and polyvinyl alcohol obtained by hydrolyzing said polyvinyl ester. This investigation led to the following findings. When a vinyl ester such as vinyl acetate undergoes radical polymerization in the presence of a fluorine-containing thiol, there is obtained a polyvinyl ester such as polyvinyl acetate having a fluorine-containing end group. This polymer, upon saponification, provides polyvinyl alcohol having a fluorine-containing end group. These polymers thus obtained have the surface characteristic of fluorocarbon compound. The present invention is based on these findings.

SUMMARY OF THE INVENTION

Accordingly, it is an object of this invention to provide a polymer having a fluorine-containing end group which is produced by polymerizing a monomer capable of radical polymerization in the presence of a fluorine-containing thiol.

It is another object of this invention to provide a polyvinyl ester having a fluorine-containing end group which is produced by polymerizing a monomer capable of radical polymerization in the presence of a fluorine-containing thiol.

It is further another object of this invention to provide polyvinyl alcohol having a fluorine-containing end group which is produced by saponifying the above-mentioned polyvinyl ester.

It is still further another object of this invention to provide a process for producing the aforesaid polymers.

The polymers of this invention are superior in water repellency, oil repellency, heat resistance, chemical resistance, and surface activity which are characteristic of fluorocarbon compounds.

DETAILED DESCRIPTION OF THE PREFERRED EMBODIMENTS

The polymer having a fluorine-containing end group is represented by the formula $R_f-(X)_m-S-P$ (m is 0 or 1), wherein $R_f$ is a fluorine-containing group such as a fluorinated alkyl group represented by the formula (1) below and a fluorinated alkyl ether group represented by the formula (2) or (3) below.

Formula (1)

wherein q is 2 to 20, and A is hydrogen, fluorine,

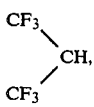

or

Formula (2)

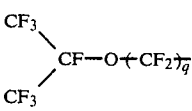

wherein q is 2 to 20.
Formula (3)

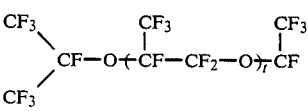

wherein t is 1 to 10.

Examples of $R_f$ include $H(CF_2)_2$, $H(CF_2)_4$, $H(CF_2)_6$, $H(CF_2)_8$, $F(CF_2)_2$, $F(CF_2)_3$, $F(CF_2)_4$, $F(CF_2)_5$, $F(CF_2)_6$, $F(CF_2)_7$, $F(CF_2)_8$, $F(CF_2)_9$, $F(CF_2)_{10}$,

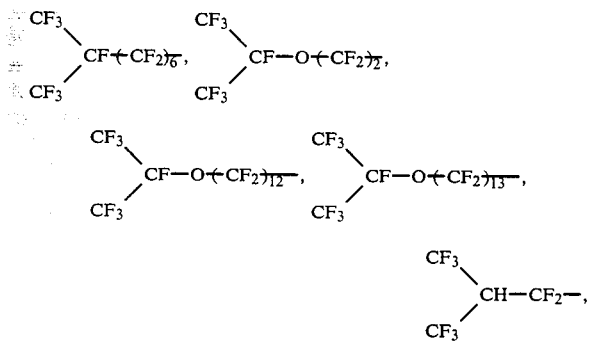

and

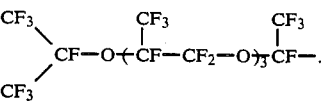

X is a group that links $R_f$ to S. Since it is considered that X affects the properties of the polymer less than $R_f$, it is not specifically limited in this invention. The preferred examples are alkylene group of formula (6), alkylene ether group of formula (7), alkylene amide group of formula (8), alkylene thioether of formula (9), alkylene imine group of formula (10), and alkylene ester group of formula (11) or (12) shown below.

Formula (6)

$(CH_2)_n$ (wherein n is 1 to 5.)
Formula (7)

$(CH_2)_pO(CH_2)_n$ (wherein p is 1 to 5 and n is 1 to 5.)
Formula (8)

$-CONH(CH_2)_n$ (wherein n is 1 to 5.)
Formula (9)

$-(S)_r(CH_2)_p-B(CH_2)_n$ (wherein p is 1 to 5, n is 1 to 5, B is Sulfur or Oxygen, and r is 0 or 1 when B is Sulfur, and r is 1 when B is Oxygen.)
Formula (10)

$$+CH_2\overset{R_8}{\underset{|}{N}}+CH_2\overset{}{\rangle_n}$$

(wherein p is 1 to 5, n is 1 to 5, and $R_8$ is a $C_{1-5}$ alkyl group.)
Formula (11)

$(CH_2)_pCOO(CH_2)_n$ (wherein p is 1 to 5, and n is 1 to 5.)
Formula (12)

$-COO(CH_2)_n$ (wherein n is 1 to 5.)

Typical examples of X include $CH_2O(CH_2)_3$, $(CH_2)_2$, $(CH_2)_4$, $$+CH_2\overset{}{\rangle_2}\underset{|}{N}+CH_2\overset{}{\rangle_3},$$
$$CH_3$$

$-S(CH_2)_2$, $(CH_2)_2S(CH_2)_3$, $-S(CH_2)_2O(CH_2)_2$, $-S(CH_2)_2S(CH_2)_2$, $-CONH(CH_2)_2$, $(CH_2)_2COO(CH_2)_3$, and $-COO(CH_2)_3$.

P in the formula $R_f-(X)_m-S-P$ (m is 0 or 1) represents a polymer unit formed from a monomer capable of radical polymerization. It is not specifically limited. Examples of the polymer unit include olefins such as ethylene, propylene, isobutylene; acrylic acid; acrylate esters such as methyl acrylate, ethyl acrylate, butyl acrylate, and lauryl acrylate; methacrylic acid; methacrylate esters such as methyl methacrylate, butyl methacrylate, lauryl methacrylate, dimethylaminoethyl methacrylate, and 2-hydroxyethyl methacrylate; vinyl halides such as vinyl chloride and vinylidene chloride; acrylamide, methacrylamide, and acrylamide derivatives such as 2-acrylamide-2-methylpropanesulfonic acid and salt thereof, and dimethyl acrylamide; acrylonitrile; methacrylonitrile; styrene and styrene derivatives such as p-styrenesulfonic acid and salt thereof; vinyl ethers such as methyl vinyl ether, ethyl vinyl ether, butyl vinyl ether, and lauryl vinyl ether; maleic anhydride and maleic acid derivatives such as maleic monoester and maleic diester; itaconic acid and fumaric acid and monoesters and diesters thereof; allyl compounds such as allyl alcohol and allyl acetate; conjugated diene compounds such as butadiene and isoprene; vinyl esters such as vinyl acetate, vinyl formate, vinyl propionate, Versatic acid vinyl ester ("VeoVa 10", a product of Shell), vinyl laurate, and vinyl stearate; and vinyl alcohol.

The polymer unit represented by the formula (4) below is preferred.

Formula (4)

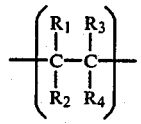

wherein $R_1$ is hydrogen, a $C_{1-10}$ alkyl group, halogen, or aryl group;

$R_2$ is hydrogen or $CH_2=CH-$;

$R_3$ is hydrogen, a $C_{1-10}$ alkyl group, halogen, or CN; and $R_4$ is hydrogen, hydroxyl group, a $C_{1-10}$ alkyl group, $C_{1-20}$ acyloxy group, halogen, aryl group, CN, or COOH or salt, ester, or amide thereof.

(A $C_1$ acyloxy group denotes

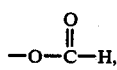

a $C_2$ acyloxy group denotes

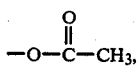

and so forth.)

The preferred examples of the polymer unit represented by the formula (4) include acrylic acid, methacrylic acid, acrylate ester, methacrylate ester, styrene, acrylonitrile, vinyl chloride, ethylene, acrylamide, butadiene, isoprene, vinyl acetate, vinyl formate, vinyl propionate, Versatic acid vinyl ester, vinyl laurate, vinyl stearate, and vinyl alcohol.

The polymer having a fluorine-containing end group covered in this invention is not restricted in the degree of polymerization and the molecular weight distribution. In view of the fact that the polymer of this invention has the fluorine-containing group only at the end of the molecule, the effect of introducing the fluorine-containing group lessens when the degree of polymerization is excessively high. Hence, the degree of polymerization should preferably be lower than 3500, and more preferably lower than 2000, with the lower limit being about 10, although not mandatory.

A detailed description is given in the following of the vinyl polymer having a fluorine-containing end group among the polymers having a fluorine-containing end group. The vinyl polymer is represented by the formula $R_f-(X)_m-S-P$ (m is 0 or 1), wherein P contains at least one member selected from the structural units Y and Z represented by the formulas below. The vinyl polymer has a degree of polymerization lower than 3500.

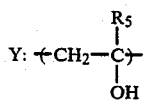

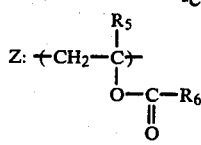

wherein $R_5$ is hydrogen or a $C_{1-6}$ alkyl group, and $R_6$ is hydrogen or a $C_{1-19}$ alkyl group.

Examples of the structural unit Y include vinyl alcohol, α-methylvinyl aclohol, α-ethylvinyl alcohol, α-propylvinyl alcohol, α-butylvinyl alcohol, and α-hexylvinyl alcohol.

Examples of the structural unit Z include vinyl acetate, vinyl formate, vinyl propionate, vinyl laurate, vinyl stearate, and Versatic acid vinyl ester, and α-substituted compounds thereof.

The vinyl polymer of this invention should contain as an essential element at least one member selected from the structural units Y and Z, but it may contain a small quantity of other structural units than Y and Z. Examples of such structural units include olefins such as ethylene, propylene, and isoprene; acrylic acid; acrylate esters such as methyl acrylate, ethyl acrylate, butyl acrylate, and lauryl acrylate; methacrylic acid; methacrylate esters such as methyl methacrylate, butyl methacrylate, lauryl methacrylate, dimethylaminoethyl methacrylate, and 2-hydroxyethyl methacrylate; vinyl halides such as vinyl chloride, vinylidene chloride; vinyl fluoride, vinylidene fluoride, and tetrafluoroethylene; acrylamide, methacrylamide, and acrylamide derivatives such as 2-acrylamide-2-methylpropanesulfonic acid and salt thereof, and dimethyl acrylamide; acrylonitrile; methacrylonitrile; styrene and styrene derivatives such as p-styrenesulfonic acid and salt thereof; vinyl ethers such as methyl vinyl ether, ethyl vinyl ether, butyl vinyl ether, and lauryl vinyl ether; maleic anhydride and maleic acid derivatives such as maleic monoester and maleic diester; itaconic acid and fumaric acid and monoesters and diesters thereof; and vinyl esters other than the structural unit Z.

An example of the vinyl polymer having a fluorine-containing end group is one represented by the formula $R_f-(X)_m-S-P$ (m is 0 or 1), wherein P contains at least one member selected from the structural units Y and Z represented by the formulas below. The content of Z is 50 mol% to 100 mol%, and the vinyl polymer has a degree of polymerization lower than 3500.

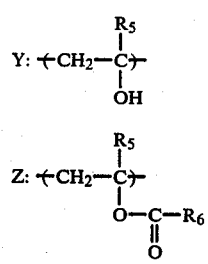

wherein $R_5$ and $R_6$ are defined as above.

Another example of the vinyl polymer having a fluorine-containing end group is one represented by the formula $R_f-(X)_m-S-P$ (m is 0 or 1), wherein P contains at least one member selected from the structural units Y and Z represented by the formulas below. The content of Y is 50 mol% to 100 mol%, and the vinyl polymer has a degree of polymerization lower than 3500.

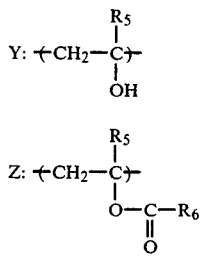

wherein R$_5$ and R$_6$ are defined as above.

The vinyl polymer having a fluorine-containing end group and the vinyl ester polymer for an example of this vinyl polymer and the vinyl alcohol polymer for another example of this vinyl polymer are not restricted in the degree of polymerization, the molecular weight distribution, and the degree of saponification. In view of the fact that these polymers have the fluorine-containing group only at the end of the molecule, the effect of introducing the fluorine-containing group lessens when the degree of polymerization is excessively high. Hence, the degree of polymerization should preferably be lower than 3500, and more preferably lower than 2000, with the lower limit being about 10, although not mandatory. The vinyl alcohol polymer should preferably have the degree of saponification higher than 70 mol% from the standpoint of water solubility.

A detailed description is given below of the process for producing the polymer having a fluorine-containing end group which is obtained by radical polymerization of a monomer capable of radical polymerization in the presence of a fluorinated thiol represented by the formula R$_f$—(X)$_m$—SH (m is 0 or 1).

The feature of the process of this invention resides in the radical polymerization of a monomer capable of radical polymerization which is performed in the presence of a fluorinated thiol represented by the formula R$_f$—(X)$_m$—SH (m is 0 or 1).

A variety of fluorinated thiols represented by the formula R$_f$—(X)$_m$—SH (m is 0 or 1) can be used. (R$_f$ and X are defined as above.) Examples of fluorinated thiols represented by the formula R$_f$—(X)$_m$—SH wherein m is 1 include H(CF$_2$)$_2$CH$_2$O(CH$_2$)$_3$SH, H(CF$_2$)$_4$CH$_2$O(CH$_2$)$_3$SH, H(CF$_2$)$_6$CH$_2$O(CH$_2$)$_3$SH, H(CF$_2$)$_8$CH$_2$O(CH$_2$)$_3$SH, H(CF$_2$)$_3$CH$_2$O(CH$_2$)$_3$SH, F(CF$_2$)$_5$CH$_2$O(CH$_2$)$_3$SH, F(CF$_2$)$_7$CH$_2$O(CH$_2$)$_3$SH, F(CF$_2$)$_9$CH$_2$O(CH$_2$)$_3$SH, F(CF$_2$)$_6$CH$_2$CH$_2$SH, F(CF$_2$)$_7$CH$_2$CH$_2$SH, F(CF$_2$)$_8$CH$_2$CH$_2$SH, F(CF$_2$)$_9$CH$_2$CH$_2$SH, F(CF$_2$)$_{10}$CH$_2$CH$_2$SH, F(CF$_2$)$_8$(CH$_2$)$_4$SH,

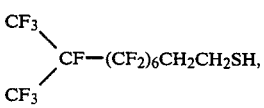

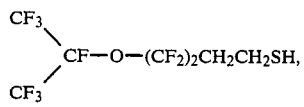

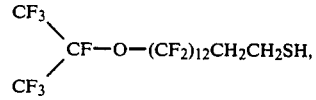

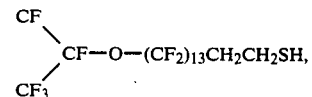

F(CF$_2$)$_8$CH$_2$CH$_2$N(CH$_2$)$_3$SH, F(CF$_2$)$_8$SCH$_2$CH$_2$SH,
|
CH$_3$

F(CF$_2$)$_{10}$SCH$_2$CH$_2$SH, F(CF$_2$)$_8$CH$_2$CH$_2$S(CH$_2$)$_3$SH, F(CF$_2$)$_8$SCH$_2$CH$_2$OCH$_2$CH$_2$SH, F(CF$_2$)$_8$SCH$_2$CH$_2$SCH$_2$CH$_2$SH, F(CF$_2$)$_3$CONHCH$_2$CH$_2$SH, F(CF$_2$)$_7$CONHCH$_2$CH$_2$SH, F(CF$_2$)$_9$CONHCH$_2$CH$_2$SH, and

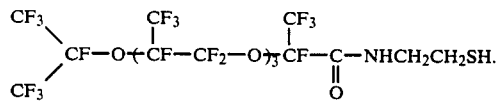

Examples of fluorinated thiols represented by the formula R$_f$—(X)$_m$—SH wherein m is 0 include C$_2$F$_5$SH, C$_4$F$_9$SH, and

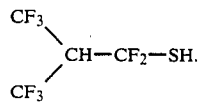

The selection of the proper thiol should be made according to the desired surface properties which are obtained when the polymer of this invention is formed into film or fiber. For example, in the case where lowering the surface energy is an objective, R$_f$ in the formula R$_f$—(X)$_m$—SH (m is 0 or 1) is preferably F(CF$_2$)$_q$ rather than H(CF$_2$)$_q$, wherein q is preferably greater than 2, with the maximum being about 20, although not mandatory.

According to the process of this invention, there are no restrictions in the quantity and method of addition of the fluorinated thiol to the polymerization system for the radical polymerization of a monomer capable of radical polymerization in the presence of a fluorinated thiol. In the polymerization system, the fluorinated thiol functions as a chain transfer agent. The quantity and method of addition of it to the polymerization system affects the degree of polymerization and the molecular weight distribution. The quantity and method of addition are properly selected according to the desired physical properties of the polymer; but they are not essential problems.

According to the process of this invention, the polymerization can be carried out by known methods such as bulk polymerization, solution polymerization, suspension polymerization, and emulsion polymerization. In addition, the polymerization can be performed batchwise, semibatchwise, or continuously. The process for polymerization employs a generally known radical polymerization initiator such as 2,2'-azobisisobutyronitrile, 2,2'-azobis(4-methoxy-2,4-dimethylvaleronitrile), benzoyl peroxide, diisopropylperoxy dicarbonate, and potassium persulfate. The polymerization temperature is 10° to 90° C. depending on the initiator employed.

The monomer used in this invention is not specifically limited so long as it is capable of radical polymerization. Vinyl ethers and allyl compounds which do not undergo radical polymerization when used alone may also be used as comonomers. Examples of these monomers are given above. The one consisting mainly of monomers represented by the formula (5) below is preferable.

Formula (5)

wherein
$R_1$ is hydrogen, a $C_{1-10}$ alkyl group, halogen, or aryl group;
$R_2$ is hydrogen or $CH_2=CH-$;
$R_3$ is hydrogen, a $C_{1-10}$ alkyl group, halogen, or CN;
$R_7$ is hydrogen, a $C_{1-10}$ alkyl group, $C_{1-20}$ acyloxy group, halogen, aryl group, CN, or COOH or salt, ester, or amide thereof.
(A $C_1$ acyloxy group denotes

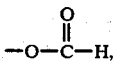

a $C_2$ acyloxy group denotes

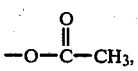

and so forth.)

Preferred examples of the monomer represented by the formula (5) include acrylic acid, methacrylic acid, acryalte ester, methacrylate ester, styrene, acrylonitrile, vinyl chloride, ethylene, acrylamide, butadiene, isoprene, vinyl acetate, vinyl formate, vinyl propionate, Versatic acid vinyl ester, vinyl laurate, and vinyl stearate.

A detailed description is given below of the process for producing a vinyl ester polymer having a fluorine-containing end group represented by the formula $R_f-(X)_m-SH$ (m is 0 or 1), by polymerizing a vinyl ester such as vinyl acetate in the presence of a fluorinated thiol. A detailed description is also given below of the process for producing a vinyl alcohol polymer having a fluorine-containing end group by saponifying said vinyl ester polymer. ($R_f$ and X are defined as above.)

According to the process of this invention, there are no restrictions in the quantity and method of addition of the fluorinated thiol (represented by the formula $R_f-(X)_m-SH$ (m is 0 or 1)) to the polymerization system for the polymerization of a vinyl ester in the presence of the fluorinated thiol. In the polymerization system, the fluorinated thiol functions as a chain transfer agent. The quantity and method of addition of it to the polymerization system affects the degree of polymerization and the molecular weight distribution. The quantity and method of addition are properly selected according to the desired physical properties of the polymer; but they are not essential problems.

According to the process of this invention, the polymerization can be carried out by known methods such as bulk polymerization, solution polymerization, suspension polymerization, and emulsion polymerization. The solution polymerization that employs methanol or toluene is industrially preferable. In addition, the polymerization can be performed batchwise, semibatchwise, or continuously. The process for polymerization employs a generally known radical polymerization initiator such as 2,2'-azobisisobutyronitrile, 2,2'-azobis(4-methoxy-2,4-dimethylvaleronitrile), benzoyl peroxide, diisopropylperoxy dicarbonate, and potassium persulfate. The polymerization temperature is 10° to 90° C. depending on the initiator employed.

The vinyl ester that can be used in this invention includes vinyl acetate, vinyl formate, vinyl propionate, Versatic acid vinyl ester (VeoVa 10, a product of Shell), vinyl laurate, and vinyl stearate. For the production of vinyl alcohol polymer by saponification after polymerization, it is preferable to use vinyl acetate as the principal monomer.

In the polymerization process, the above-mentioned vinyl ester can be copolymerized with the above-mentioned comonomers.

The vinyl ester polymer having a fluorine-containing end group can be saponified by the known method to give vinyl alcohol polymer. The known method includes alkali saponification and acid saponification. Saponification with NaOH or $CH_3ONa$ in methanol is industrially preferable. The saponification temperature is not specifically limited; but it is preferably 20° to 60° C. from the standpoint of preventing the discoloration of the resulting vinyl alcohol polymer. NaOH or $CH_3ONa$ is used in an amount of 0.001 to 0.2 mol per 1 mol of vinyl ester unit, so that the discoloration of vinyl alcohol polymer is prevented and the quantity of sodium acetate in the polymer can be reduced. In the case where the polymer contains acidic comonomer units which consume alkali, the quantity of NaOH or $CH_3ONa$ should be increased accordingly.

The polymer having a fluorine-containing end group obtained in this invention has the same bulk properties as the ordinary polymer. However, a cast film formed from a solution of the polymer exhibits greater water repellency and oil repellency than the ordinary polymer. When a fluorinated alkyl chain is introduced into the terminal of water-soluble polymers such as polyvinyl alcohol, polyacrylic acid and polyacrylamide, their aqueous solutions exhibit great surface activity.

The polymer having a fluorine-containing end group obtained in this invention exhibits the characteristic properties of surface chemistry. It is expected to find various uses that empoly the properties. In the case of general-purpose resins such as polymethyl methacrylate, polystyrene, polyvinyl chloride, and polyethylene, the process of this invention makes it possible to impart the surface properties of fluorocarbons only to the surface of such resins. This can also be accomplished by blending a general-purpose resin with the resin of this invention. In addition, water-soluble polymers such as polyvinyl alcohol, polyacrylic acid, polymethacrylicacid, and polyacrylamide incorporated with a fluorine-containing end group can be used as a new fluorocarbon surfactant.

Among the polymers having a fluorine-containing end group obtained in this invention, the vinyl ester polymer having a fluorine-containing end group has the same bulk properties as the ordinary vinyl ester polymer. However, a cast film formed from a solution in an organic solvent such as methanol, acetone, and toluene exhibits greater water repellency and oil repellency than the ordinary vinyl ester polymer.

This phenomenon is pronounced in the case of vinyl alcohol polymer. A cast film formed from an aqueous solution of ordinary polyvinyl alcohol has no oil repellency.

Being naturally water-soluble, polyvinyl alcohol is poor in water repellency. Contrary to this, a cast film obtained from an aqueous solution of the vinyl alcohol polymer having a fluorine containing end group of this invention exhibits both great water repellency and oil repellency. This is attributable to the fact that the chains containing fluorine atoms migrate to the film surface, forming thereon a thin layer rich with the fluorine-containing group, at the time of film forming. A similar phenomenon is observed in the case of polyvinyl alcohol having hydrocarbon chains in place of fluorine-containing groups; but oil repellency is very low (although a little higher than the ordinary polyvinyl alcohol). These results reflect the generally known difference between the fluorinated alkyl chain and the hydrocarbon chain.

Because of the above-mentioned characteristic properties of surface chemistry, the vinyl ester polymer and vinyl alcohol polymer, both having a fluorine-containing end group, of this invention are expected to find use in various application areas.

The vinyl ester polymer will be used as a surface modifier of various resins because of its good compatibility and miscibility with various resins.

The vinyl alcohol polymer will be applied to the surface treatment of paper, film, sheet, and textile. It exhibits both water repellency and oil repellency. The polymer can be used as vinylon yarn having a low coefficient of friction. Such vinylon yarn requires no or only a little oiling. The aqueous solution of the vinyl alcohol polymer of this invention exhibits an extremely low surface tension, and it can be used as a new fluorocarbon surfactant.

The invention is now described in more detail with reference to the following examples, in which quantities are expressed as parts by weight unless otherwise noted.

(a) Example of synthesis of fluorinated thiol:

The fluorinated thiol was synthesized from a fluoroalcohol represented by the formula $R_f(CH_2)_nOH$ through the reactions shown below. (wherein $R_f$ denotes $H(CF_2)_q$ or $F(CF_2)_q$, q is an integer of 2 to 20, and n is 1 or 2.)

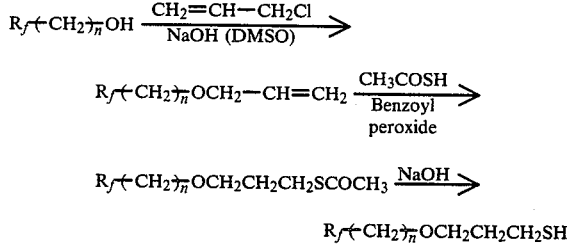

A detailed description is given below of the synthesis of a fluorinated thiol form $H(CF_2)_4CH_2OH$.

50 g of $H(CF_2)_4CH_2OH$ was dissolved in 100 ml of dimethyl sulfoxide (DMSO). 22.4 g of sodium hydroxide was added with stirring, and then 33 g of allyl chloride was dded slowly at room temperature over 2 hours. Stirring was continued for 5 hours. After filtration of precipitates, the solution was heated on a water bath to remove unreacted allyl chloride. The solution was poured into a large amount of water to separate $H(CF_2)_4CH_2OCH_2—CH=CH_2$. A small quantity of BPO of the order of mg was added to $H(CF_2)_4CH_2OCH_2—CH=CH_2$, and then thiolacetic acid was added with stirring at room temperature over 2 hours. Unreacted thiolacetic acid was removed under reduced pressure. 100 cc of methanol and 10 g of sodium hydroxide were added, and reaction was carried out at 60° C. for 3 hours. After cooling to room temperature, the reaction product was poured into a large amount of water to give crude $H(CF_2)_4CH_2OCH_2CH_2CH_2SH$. Upon distillation, there was obtained a purified product having bp. 57° C./3 mmHg. The structure of this compound was confirmed by $^1H$—NMR.

(b) Production of polymer having a fluorinated end group:

EXAMPLE 1

Into a reactor were charged 200 parts of distilled water, 20 parts of 5% aqueous solution of methacrylic acid, and 10 parts of sodium monohydrogenphosphate. After mixing and dissolution at room temperature, the atmosphere of the reactor was replaced with nitrogen. To the reactor was added 100 parts of methyl methacrylate (abbreviated as MMA hereinafter) containing 0.20 parts of 2,2'-azobisisobutyronitrile and 2.02 parts of fluorine-containing thiol $H(CF_2)_8CH_2OCH_2CH_2CH_2SH$ prepared according to the above-mentioned example of synthesis. The external temperature was raised to 70° C. to start polymerization. Polymerization was continued with stirring for 10 hours. After cooling, filtration, washing, and drying, there was obtained polymethyl methacrylate having a fluorine-containing end group. According to elemental analysis, the content of fluorine in the polymer was 1.10 wt%. The average degree of polymerization was 530.

EXAMPLE 2

Into a reactor were charged 300 parts of distilled water and 0.05 g of PVA 217 (a product of Kuraray Co., Ltd., degree of polymerization: 1700, degree of saponification: 88 mol%). After mixing and dissolution at 90° C., the reactor was cooled to room temperature and the atmosphere of the reactor was replaced with nitrogen. To the reactor was added 100 parts of styrene containing 1.0 part of 2,2'-azobisisobutyronitrile and 1.05 parts of fluorine-containing thiol $F(CF_2)_7CH_2OCH_2CH_2CH_2SH$. The external temperature was raised to 80° C. to start polymerization. Polymerization was continued with stirring for 20 hours. After cooling, filtration, washing, and drying, there was obtained granular polystyrene having a fluorine-containing end group. According to elemental analysis, the content of fluorine in the polymer was 0.59 wt%. The average degree of polymerization was 380.

EXAMPLE 3

Into a pressure reactor were charged 100 parts of cyclohexane, 1.5 parts of fluorine-containing thiol $F(CF_2)_9CH_2OCH_2CH_2CH_2SH$, and 1.0 part of 2,2'-azobisisobutyronitrile. The atmosphere of the reactor was replaced with nitrogen. To the reactor was added 100 parts of liquefied vinyl chloride. The reactor was heated to 50° C. to start polymerization. Polymerization was continued with stirring for 24 hours. After cooling to room temperature, unreacted vinyl chloride was removed and then cyclohexane was removed under reduced pressure. Thus there was obtained polyvinyl chloride having a fluorine-containing end group. The polymer was washed with ethanol and water, and then dried. According to elemental analysis, the content of fluorine in the polymer was 0.9 wt%. The average degree of polymerization was 350.

EXAMPLE 4

Into a reactor was charged 480 parts of distilled water, and the atmosphere of the reactor was replaced with nitrogen. To the reactor was added 100 parts of acrylonitrile and 1.30 parts of fluorine-containing thiol $F(CF_2)_7CONHCH_2CH_2SH$. The reactor was heated, and when the internal temperature reached 60° C., 20 parts of distilled water containing 0.5 parts of potassium persulfate was added to start polymerization. Polymerization was continued with stirring for 10 hours. After cooling, filtration, washing, and drying, there was obtained polyacrylonitrile having a fluorine-containing end group. According to elemental analysis, the content of fluorine in the polymer was 0.77 wt%. The average degree of polymerization was 610.

EXAMPLE 5

Into a reactor were charged 380 parts of distilled water, 100 parts of acrylamide, and 5 parts of fluorine-containing thiol $F(CF_2)_7CH_2OCH_2CH_2CH_2SH$. The atmosphere of the reactor was replaced with nitrogen. The reactor was heated, and when the internal temperature reached 60° C., 20 parts of distilled water containing 0.2 parts of potassium persulfate was added to start polymerization. Polymerization was continued with stirring for 8 hours. Methanol was added to precipitate polyacrylamide having a fluorine-containing end group. The polymer was thoroughly washed with methanol and dried. According to elemental analysis, the content of fluorine in the polymer was 2.67 wt%. The average degree of polymerization was 420.

EXAMPLE 6

Into a reactor were charged 280 parts of distilled water, 100 parts of acrylic acid, and 3 parts of fluorine-containing thiol $H(CF_2)_8CH_2OCH_2CH_2CH_2SH$. The atmosphere of the reactor was replaced with nitrogen. The reactor was heated, and when the internal temperature reached 70° C., 20 parts of distilled water containing 0.5 parts of potassium persulfate was added to start polymerization. Polymerization was continued with stirring for 5 hours. After cooling, acetone was added to precipitate polyacrylic acid having a fluorine-containing end group. The polymer was thoroughly washed with acetone and dried. According to elemental analysis, the content of fluorine in the polymer was 1.97 wt%. The average degree of polymerization was 640.

The effect of the fluorinated terminal alkyl chain was investigated by using some of the polymers obtained in the examples. The test items and test methods are given below, and the results are shown in Tables 1 and 2. Ordinary polymers of the same degree of polymerization were used as control.

Control 1—Polymethyl methacrylate
Control 2—Polystyrene
Control 3—Polyvinyl chloride
Control 5—Polyacrylamide
Control 6—Polyacrylic acid (1) Oil repellency of film surface Each of the polymers obtained in Examples 1 to 3 was dissolved in a solvent, and the solution was cast onto polyethylene terephthalate (PET) film at room temperature. The resulting cast film was thoroughly dried under reduced pressure. A drop of n-octane was placed on the surface (opposite to PET) of the cast film and "wetting" was rated as follows.

1 . . . n-Octane remains as a drop on the film surface.
2 . . . The film surface partly gets wet with n-octane.
3 . . . The film surface completely gets wet with n-octane.

(2) Surface tension of aqueous solution

Each of the polymers obtained in Example 5 and 6 was dissolved in water to make a 0.2% aqueous solution, and the surface tension of the aqeous solution was measured at 20° C.

TABLE 1

| No. | Solvent for casting | Oil repellency |
| --- | --- | --- |
| Example 1 | Toluene | 1 |
| Control 1 | Toluene | 3 |
| Example 2 | Toluene | 1 |
| Control 2 | Toluene | 3 |
| Example 3 | Tetrahydrofuran | 1 |
| Control 3 | Tetrahydrofuran | 3 |

TABLE 2

| No. | Surface tension of 0.2% aqueous solution (dyne/cm) |
| --- | --- |
| Example 5 | 55.0 |
| Control 5 | 68.0 |
| Example 6 | 52.5 |
| Control 6 | 65.0 |

The cast film of the polymethyl methacrylate having a fluorine-containing end group as obtained in Example 1 was heat bonded to the cast film of the polymer of control 1 at 180° C. under a load of 20 kg/cm² for 1 minute, with the PET side of the former being the adherend surface. Complete adhesion was obtained, and the surface of the former film exhibited oil repellency of the same degree as mentioned above.

(c) Production of vinyl ester polymer and vinyl alcohol polymer, each having a fluorine-containing end group:

EXAMPLE 7

Into a reacter were charged 960 parts of vinyl acetate (abbreviated as VAc hereinafter), 220 parts of methanol, and 0.086 parts of fluorinated thiol $H(CF_2)_8CH_2OCH_2CH_2CH_2SH$. The atmosphere of the reactor was replaced with nitrogen. The reactor was heated, and when the internal temperature reached 60° C., 20 parts of methanol containing 0.174 parts of 2,2'-azobisisobutyronitrile was added. Immediately, 60 parts of methanol containing 0.79 parts of fluorinated thiol $H(CF_2)_8CH_2OCH_2CH_2CH_2SH$ was added evenly over 3 hours.

Conversion to polymer after 3 hours was 37.6%. After cooling, unreacted VAc was removed together with methanol under reduced pressure by replenishing methanol. Thus there was obtained a methanol solution (42.3%) of vinyl acetate polymer having a fluorine-containing end group.

To a portion of this solution was added methanol solution of NaOH so that the molar ratio of NaOH to VAc became 0.02. Upon saponification at 40° C., there was obtained polyvinyl alcohol (PVA) having a fluorine-containing end group. The degree of saponification was 99.0%. The degree of polymerization of the polymer was 1320. (measured for polyvinyl acetate obtained by reacetifying the polyvinyl alcohol with an acetic anhydride-pyridine mixture.) (The degree of polymerization (P) was calculated according to Nakajima's formula $[\eta]=7.94\times10^{-3}\times P^{0.62}$, wherein $[\eta]$ was measured in acetone at 30° C. According to elemental analysis, the content of fluorine in the PVA was 0.26 wt%.

EXAMPLES 8 TO 14

Polyvinyl acetate and polyvinyl alcohol (PVA), each having a fluorine-containing end group, were prepared in the same way as in Example 7, except that the fluorinated thiol was changed. Table 3 shows the recipes, the results of polymerization, and the degree of polymerization of the resulting polymers.

TABLE 3

| Example | Fluorinated thiol Kind | Quantity added (in parts) Initial | Quantity added (in parts) Continuous | Conversion to polymer after 3 hours (%) | Degree of polymerization | Degree of saponification of PVA (mol %) | Content of fluorine in PVA (wt %) |
|---|---|---|---|---|---|---|---|
| 8  | H$(CF_2)_6$CH$_2$OCH$_2$CH$_2$CH$_2$SH | 0.137 | 1.27 | 35.1 | 950  | 98.9 | 0.26 |
| 9  | H$(CF_2)_4$CH$_2$OCH$_2$CH$_2$CH$_2$SH | 0.26  | 2.39 | 37.6 | 490  | 99.1 | 0.40 |
| 10 | F$(CF_2)_7$CH$_2$OCH$_2$CH$_2$CH$_2$SH | 0.080 | 0.74 | 36.8 | 1350 | 98.7 | 0.67 |
| 11 | F$(CF_2)_9$CH$_2$OCH$_2$CH$_2$CH$_2$SH | 0.048 | 0.45 | 37.2 | 1620 | 99.0 | 0.23 |
| 12 | F$(CF_2)_7$CH$_2$CH$_2$SH | 0.073 | 0.67 | 38.0 | 1450 | 98.5 | 0.16 |
| 13 | F$(CF_2)_7$CONHCH$_2$CH$_2$SH | 0.080 | 0.74 | 37.1 | 1420 | 99.1 | 0.24 |
| 14 | F$(CF_2)_{10}$SCH$_2$CH$_2$SH | 0.103 | 0.95 | 37.5 | 1390 | 99.0 | 0.25 |

EXAMPLE 15

Into a reactor were charged 768 parts of vinyl acetate, 192 parts of VeoVa 10 (a product of Shell), 220 parts of methanol, and 0.52 parts of fluorinated thiol F(CF$_2$)$_9$CH$_2$OCH$_2$CH$_2$CH$_2$SH. The atmosphere of the reactor was replaced with nitrogen. The reactor was heated, and when the internal temperature of the reactor reached 60° C., 20 parts of methanol containing 0.174 parts of 2,2'-azobisisobutyronitrile to start polymerization. The rate of polymerization after 3 hours was 39.2%. After cooling, the reaction product was poured into n-hexane to separate the polymer. The polymer was purified by reprecipitation twice with acetone-n-hexane.

The degree of polymerization (P) was 1950. It was calculated according to Nakajima's formula $[\eta]=7.94\times10^{-3}\times P^{0.62}$, wherein $[\eta]$ was measured in acetone at 30° C.

CONTROLS 7 TO 9

Vinyl acetate and polyvinyl alcohol were prepared in the same way as in Example 7, except that the fluorinated thiol was replaced by 1-dodecane thiol (n—C$_{12}$H$_{25}$SH). Table 4 shows the recipes, the results of polymerization, and the degree of polymerization of the resulting polymers.

TABLE 4

| Control | 1-Dodicane thiol Initial | 1-Dodicane thiol Continuous | Conversion to polymer after 3 hours (%) | Degree of polymerization | Degree of saponification of PVA (mol %) |
|---|---|---|---|---|---|
| 7 | 0.021 | 0.17 | 37.2 | 1430 | 99.0 |
| 8 | 0.068 | 0.63 | 36.5 | 970  | 98.7 |
| 9 | 0.17  | 1.36 | 36.3 | 470  | 99.2 |

The effect of the terminal fluorinated group was investigated by using the vinyl ester polymer and vinyl alcohol polymer obtained in Examples 7 to 14 in comparison with the vinyl ester polymer and vinyl alcohol polymer having a terminal alkyl chain as obtained in Controls 7 to 9. The test items and test methods are given bElow, and the results are shown in Table 5.

(1) Surface tension of aqueous solution 0.2% aqueous solution of polyvinyl alcohol was prepared, and the surface tension of the solution was measured at 20° C.

(2) Water repellency of film surface 0.2 mm thick film was prepared by casting 3% aqueous solution of the polyvinyl alcohol onto a PET film and air-drying at room temperature. The film was heat-treated at 160° C. for 10 minutes. A water drop was placed on the film surface (opposite to PET film) and the contact angle was measured.

(3) Oil repellency of film surface 0.2 mm thick film was prepared by casting 3% methanol solution of the vinyl ester polymer onto a PET film and air-drying at room temperature. The film was heat-treated at 80° C. for 1 hour.

A drop of n-octane was placed on the surface (opposite to PET film) of the cast film of polyvinyl alcohol (as obtained in (2) above) and the surface (opposite to PET film) of the cast film of vinyl ester polymer. "Wetting" of the film surface was rated as follows.

1 . . . n-Octane remains as a drop on the film surface.
2 . . . The film surface partly gets wet with n-octane.
3 . . . The film surface completely gets wet with n-octane.

TABLE 5

| Example | Surface tension of 0.2% aqueous solution (dyne/cm) | Water repellency (degree) | Oil repellency Vinyl ester polymer | Oil repellency Vinyl alcohol polymer |
|---|---|---|---|---|
| 7  | 60.6 | 90< | 1 | 1 |
| 8  | 61.5 | 90< | 1 | 1 |
| 9  | 64.7 | 77  | 2 | 2 |
| 10 | 57.5 | 90< | 1 | 1 |
| 11 | 52.3 | 90< | 1 | 1 |

TABLE 5-continued

| | Surface tension of 0.2% aqueous solution (dyne/cm) | Water repellency (degree) | Oil repellency | |
|---|---|---|---|---|
| | | | Vinyl ester polymer | Vinyl alcohol polymer |
| 12 | 55.3 | 90< | 1 | 1 |
| 13 | 55.0 | 90< | 1 | 1 |
| 14 | 54.2 | 90< | 1 | 1 |
| Control | | | | |
| 7 | 62.6 | 68 | 3 | 3 |
| 8 | 60.5 | 85 | 3 | 3 |
| 9 | 58.8 | 90< | 3 | 2 |

The cast film of the vinyl ester polymer having a fluorine-containing end group as obtained in this invention was heat bonded to the cast film of the ordinary polyvinyl ester at 120° C. under a load of 20 kg/cm² for 1 minute, with the PET side of the former being the adherend surface. Complete adhesion was obtained, and the surface of the former film exhibited oil repellency of the same degree as mentioned above.

What is claimed is:

1. A polymer having an organic fluorine-containing group only at the end of said polymer represented by the formula $$R_f-(X)_m-S-P$$

wherein m is 0 or 1 and $R_f$ is:
   (a) a fluorinated alkyl group which is represented by $$A-(CF_2-)_q$$

wherein A is hydrogen, fluorine, $(CF_3)_2CH$, or $(CF_3)_2CF$ and q is 2-20; or
   (b) a fluorinated alkyl ether group which is $(CF_3)_2-CF-O-(CF_2)_q$ wherein q is 2-20, or $(CF_3)_2-CF-O-[CF(-CF_3)-CF_2-O-]_t-CF(-CF_3)$, wherein t is 1 to 10;
wherein P is a polymeric base formed from a monomer capable of radical polymerization, said monomer being represented by $$\begin{pmatrix} R_1 & R_3 \\ | & | \\ C=C \\ | & | \\ R_2 & R_4 \end{pmatrix}$$

wherein
   $R_1$ is hydrogen, a $C_{1-10}$ alkyl group, halogen, or aryl group;
   $R_2$ is hydrogen or $CH_2=CH-$;
   $R_3$ is hydrogen, a $C_{1-10}$ alkyl group, halogen, or CN; and
   $R_4$ is hydrogen, a hydroxyl group, $C_{1-10}$ alkyl group, $C_{1-20}$ acyloxy group, halogen, aryl group, CN, or COOH or a salt, ester, or amide thereof; and
wherein X is a group that links $R_f$ to S.

2. A polymer having an organic fluorine-containing group only at the end of said polymer, represented by the formula $$R_f-(X)_m-S-P$$

wherein m is 0 or 1 and $R_f$ is:
   (a) a fluorinated alkyl group which is represented by $$A-(CF_2-)_q$$

wherein A is hydrogen, fluorine, $(CF_3)_2CH$, or $(CF_3)_2CF$ and q is 2-20; or
   (b) a fluorinated alkyl ether group which is $(CF_3)_2-CF-O-(CF_2)_q$ wherein q is 2-20, or $(CF_3)_2-CF-O-[CF(-CF_3)-CF_2-O-]_tC-F(-CF_3)$,
   wherein t is 1 to 10;
wherein P is a polymeric base formed from a monomer capable of radical polymerization;
wherein X is a group that links $R_f$ to S; and
wherein the fluorine content of said polymer is not greater than 2.67%.

3. A process for producing the polymer of claims 1 or 2 which comprises performing the radical polymerization of a monomer capable of radical polymerization in the presence of a fluorinated thiol represented by the formula $$R_f-(X)_m-SH$$

wherein m is 0 or 1 and $R_f$ is
   (a) a fluorinated alkyl group which is represented by $$A-(CF_2-)_q$$

wherein A is hydrogen, fluorine, $(CF_3)_2CH$, or $(CF_3)_2CF$ and q is 2-20; or
   (b) a fluorinated alkyl ether group which is $(CF_3)_2-CF-O-(CF_3)_q$ wherein q is 2-20, or $(CF_3)_2-CF-O-[CF(-CF_3)-CF_2-O-]_tC-F(-CF_3)$,
   wherein t is 1 to 10; and
wherein X is a group that links $R_f$ to SH.

4. A process for producing a vinyl alcohol polymer having a fluorine-containing end group which comprises performing the radical polymerization of a monomer composed mainly of vinyl ester in the presence of a fluorinated thiol represented by the formula $$R_f-(X)_m-SH$$

and subsequently saponifying the resulting polymer, wherein m is 0 or 1 and $R_f$ is
   (a) a fluorinated alkyl group which is represented by $$A-(CF_3-)_q$$

wherein A is hydrogen, fluorine, $(CF_3)_2CH$, or $(CF_3)_2CF$ and q is 2-20; or
   (b) a fluorinated alkyl ether group which is $(CF_3)_2CF-O-(CF_2)_q$ wherein q is 2-20, or $(CF_3)_2-CF-O-[-CF(-CF_3)-CF_2-O-]_t-CF(-CF_3)$, wherein t is 1 to 10; and
wherein X is a group that links $R_f$ to SH.

5. The polymer of claim 1, wherein when $R_1$, $R_3$ or $R_4$ is halogen, said halogen is bromine or chlorine.

6. The polymer of claim 5, wherein said halogen is chlorine.

7. A vinyl polymer having a fluorine-containing end group represented by the formula $R_f-(X)_m-S-P$ (m is 0 or 1) as claimed in claim 1 or 2, wherein P contains at least one member selected from the following structural units Y and Z, said polymer having a degree of polymerization lower than 3500.

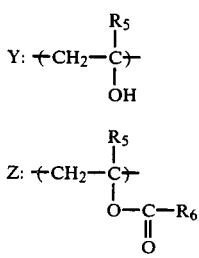

wherein R₅ is hydrogen or a $C_{1-6}$ alkyl group, and R₆ is hydrogen or a $C_{1-19}$ alkyl group.

8. A vinyl ester polymer having a fluorine-containing end group represented by the formula $R_f—(X)_m—S—P$ (m is 0 or 1) as claimed in claim 7, wherein P contains at least structural unit Z of the following structural units Y and Z, the content of Z being 50 mol% to 100 mol% and said polymer having a degree of polymerization lower than 3500.

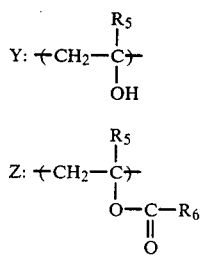

9. A vinyl alcohol polymer having a fluorine-containing end group represented by the formula $R_f—(X)_m—S—P$ (m is 0 or 1) as claimed in claim 7, wherein P contains at least structural unit Y of the following structural units Y and Z, the content of Y being 50 mol% to 100 mol% and said polymer having a degree of polymerization lower than 3500

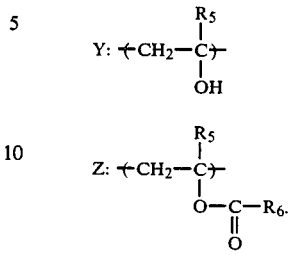

10. A process for producing a polymer having a fluorine-containing end group as claimed in claim 3, wherein the monomer capable of radical polymerization is one which is composed mainly of the monomer represented by the formula (5)

Formula (5)

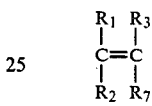

wherein
R₁ is hydrogen, a $C_{1-10}$ alkyl group, halogen, or aryl group;
R₂ is hydrogen or $CH_2=CH—$;
R₃ is hydrogen, a $C_{1-10}$ alkyl group, halogen, or CN; and
R₇ is hydrogen, a $C_{1-10}$ alkyl group, $C_{1-20}$ acyloxy group, halogen, aryl group, CN, or COOH or salt, ester, or amide thereof.

* * * * *